US010352561B1

(12) United States Patent
Thompson (10) Patent No.: US 10,352,561 B1
(45) Date of Patent: Jul. 16, 2019

(54) OXYGEN INJECTED BIOMASS TO BTUS TRANSFORMER

(71) Applicant: Douglas M. Thompson, Debary, FL (US)

(72) Inventor: Douglas M. Thompson, Debary, FL (US)

(73) Assignee: Douglas M. Thompson, De Bary, FL (US)

( * ) Notice: Subject to any disclaimer, the term of this patent is extended or adjusted under 35 U.S.C. 154(b) by 0 days.

(21) Appl. No.: 15/878,437

(22) Filed: Jan. 24, 2018

(51) Int. Cl.
*F23L 7/00* (2006.01)
*F23B 10/02* (2011.01)
*F23B 90/04* (2011.01)

(52) U.S. Cl.
CPC .............. *F23L 7/007* (2013.01); *F23B 10/02* (2013.01); *F23B 90/04* (2013.01); *F23L 2900/07005* (2013.01); *F23N 2027/36* (2013.01)

(58) Field of Classification Search
CPC ... F23L 7/007; F23L 2900/07005; F23L 9/00; F23B 10/02; F23B 90/04; F23N 2027/36; F23N 2037/16; F23C 5/32; F23C 2900/03006; F23C 2900/06041; F23C 2900/07022; F23C 5/14; F23C 5/24; F23C 5/28; F23M 9/02; F23D 14/70; F23D 14/84
USPC ............................................. 437/9, 8, 10, 2
See application file for complete search history.

(56) References Cited

U.S. PATENT DOCUMENTS

| 4,378,974 | A  | * | 4/1983  | Petit ..................... | C10J 3/002 48/197 R |
| 4,566,393 | A  | * | 1/1986  | Connell ................ | F22B 31/045 110/101 CA |
| 5,425,792 | A  | * | 6/1995  | Bishop ................... | C10J 3/002 252/373 |
| 5,823,122 | A  | * | 10/1998 | Chronowski ........... | F23B 10/02 110/346 |
| 6,005,149 | A  | * | 12/1999 | Bishop ..................... | C10J 3/06 201/27 |
| 7,531,148 | B2 | * | 5/2009  | Cornay ................ | A61K 31/662 210/294 |
| 2002/0069648 | A1 | * | 6/2002  | Levy ...................... | F23C 9/006 60/804 |
| 2006/0213196 | A1 | * | 9/2006  | Sukioka .................. | F02G 1/055 60/651 |
| 2011/0083435 | A1 | * | 4/2011  | Palmer ..................... | F23D 1/00 60/650 |

(Continued)

*Primary Examiner* — Justin M Jonaitis (57) ABSTRACT

A biomass or bio-fuel combustion system is provided utilizing oxygen as the source of combustion. The system generally includes a primary combustion chamber defining an internal space for receipt of the biomass and a directional oxygen injector positioned within the combustion chamber and having a plurality of injection nozzles for injecting oxygen into the internal space, preferably at an angle relative to a longitudinal axis of the combustion chamber. A transfer chamber extends from the primary combustion chamber to a secondary combustion chamber for further combustion of any remaining particulates. A cooling and exhaust system extends from the secondary combustion chamber for drawing off and condensing out any exhaust and moisture contained in the remaining exhaust particulates. A method of burning a biomass of bio-fuel with producing nitrogen dioxide is also disclosed.

5 Claims, 6 Drawing Sheets

(56) References Cited

U.S. PATENT DOCUMENTS

2011/0296988 A1* 12/2011 Buhrman .............. B01D 45/16
  95/34

* cited by examiner

FIG. 7

OXYGEN INJECTED BIOMASS TO BTUS TRANSFORMER

FIELD OF THE INVENTION

The present invention relates generally to material combustion devices and methods, and more particularly, to a biomass or bio-fuel combustion system and method for burning biomass or bio-fuel at high temperature to minimize pollutants in resultant exhaust.

BACKGROUND OF THE INVENTION

The burning of biomasses or bio-fuels is often used to generate energy for use in subsequent systems such as hot water heating systems, engines, etc. When burning the biomass or bio-fuel, it is important to maximize the amount of combustion in order to destroy the hazardous material to the greatest extent possible and/or harness the maximum amount of heat while reducing the amount of exhaust particulates and thereby reduce pollution generated by the burning process.

Commonly known burning systems often utilize air when burning biomass or bio-fuel. Commonly available air is comprised of approximately 78% nitrogen, 21% oxygen and, 1% remaining other gases. Unfortunately, burning nitrogen above 1200° Celsius creates nitrogen dioxide, which is a heavy pollutant. Thus, to minimize pollution, combustion systems utilizing air need to keep the temperature of combustion below this level to avoid the additional nitrogen dioxide pollution. However, many biomasses and bio-fuels often require higher burn temperatures to be fully combusted and minimize pollution.

Accordingly, there is an established need for system and method of burning biomasses and bio-fuels at a sufficiently high temperature to cause relatively complete combustion while eliminating or minimizing the production of nitrogen dioxide and eliminating or minimizing pollution.

SUMMARY OF THE INVENTION

The present invention is directed to an efficient biomass or bio-fuel combustion system utilizing oxygen as the source of combustion. The system generally includes a primary combustion chamber defining an internal space for receipt of the biomass or bio-fuel (referred to hereinafter as biomass for clarity purposes) and a directional oxygen injector position within the internal space and having a plurality of injection nozzles for injection oxygen into the combustion chamber, preferably at an angle relative to a longitudinal axis of the combustion chamber. A transfer chamber extends from the primary combustion chamber to a secondary combustion chamber for further combustion of any remaining particulates. A cooling and exhaust system extends from the secondary combustion chamber for drawing off and condensing out any exhaust and moisture contained in the remaining exhaust particulates. A method of burning a biomass with producing nitrogen dioxide is also disclosed.

In a first implementation of the invention, a method of burning a biomass comprises the steps of:

providing a combustion system including a primary combustion chamber defining an internal space, an oxygen injector positioned within the internal space and having a plurality of injection nozzles in fluid communication the internal space and configured to inject a fluid therethrough and into the internal space, and a transfer chamber extending into the internal space;

positioning a biomass within the internal space;

injecting oxygen into the internal space through the plurality of injection nozzles such that the injected oxygen forms a vortex of oxygen within the internal space;

igniting the biomass within the internal space to cause an oxidation of the biomass; and exhausting resulting substances obtained from the oxidation of the biomass through the transfer chamber.

In a second aspect, the oxygen is injected at an angle greater than 0° but less than 45° relative to a longitudinal axis of the internal space.

In another aspect, the resulting substances comprised gasified biomass, and the gasified biomass is transferred through the transfer chamber to a secondary combustion chamber for further combustion.

In another aspect, the gasified biomass is conveyed into a cooling and exhaust system.

In another aspect, the gasified biomass is cooled within the cooling and exhaust system to form a liquid particulate.

Introducing another embodiment of the invention. the present invention consists of a biomass combustion system comprising:

a primary combustion chamber defining an internal space for receipt and burning of a biomass;

an oxygen injector positioned within the internal space and having a plurality of injection nozzles in fluid communication with the internal space and configured to inject a fluid therethrough and into the internal space; and a transfer chamber extending into the internal space.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements. and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an efficient biomass combustion system and method that enables a more complete combustion of biomass while extracting more heat and reducing resultant pollutants.

Figure 1:
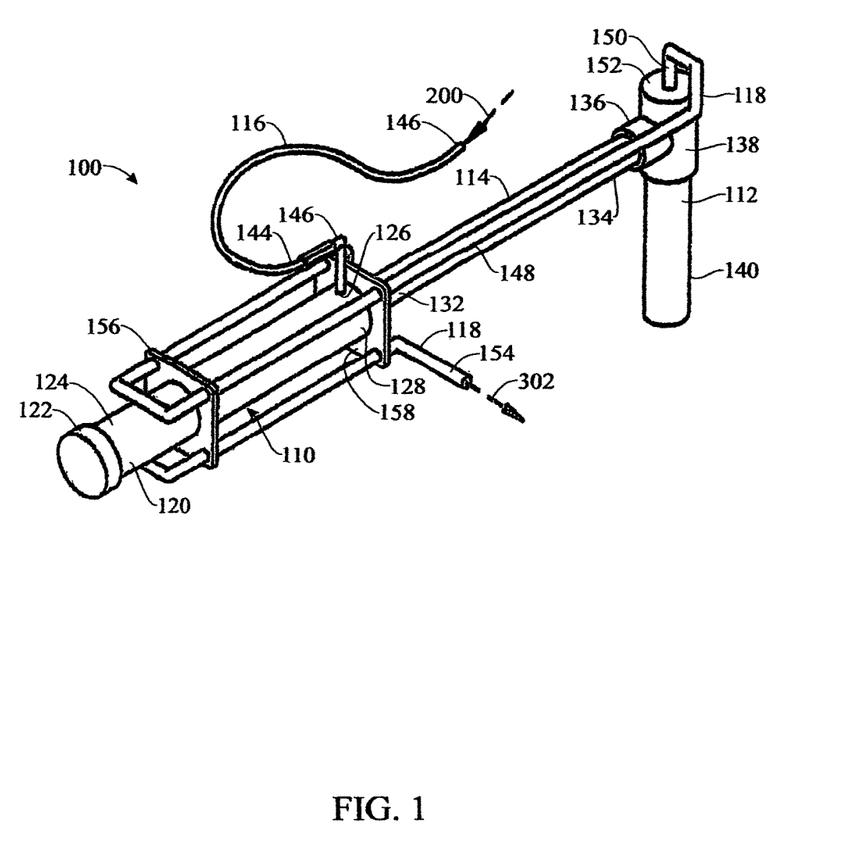
FIG. 1 presents a top, front isometric view of a biomass combustion system in accordance with an illustrative embodiment of the present invention.
Figure 2:
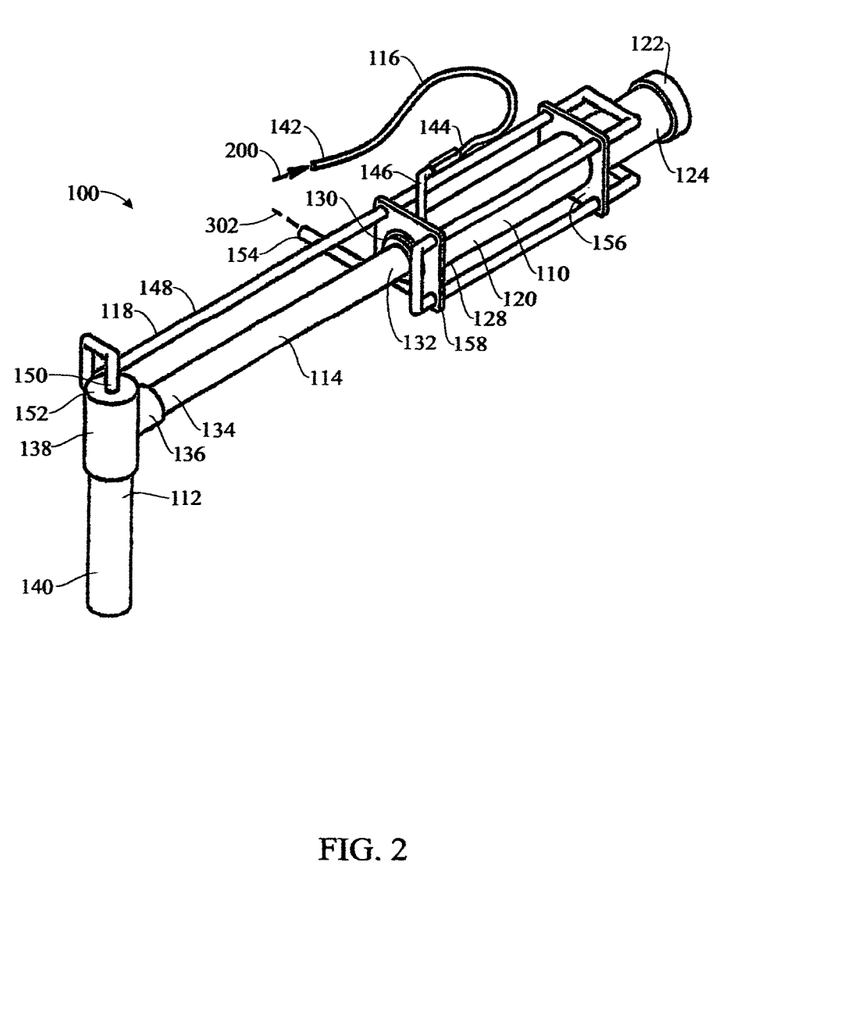
FIG. 2 presents a top, rear isometric view of the biomass combustion system of FIG. 1.

Referring initially to FIGS. 1 and 2, biomass combustion system 100 is illustrated in accordance with an exemplary embodiment of the present invention. The biomass combustion system 100 is configured as a combustion chamber and heat exchanging biomass or bio-fuel combustion system. Throughout the present detailed description, unless stated otherwise, the term biomass should be understood to refer to a biomass or bio-fuel. As shown, the biomass combustion system 100 generally includes a primary combustion chamber 110, a secondary combustion chamber or spark chamber 112 and a British Thermal Unit (BTU) transfer chamber 114 connecting the primary combustion chamber 110 to the spark chamber 112. An oxygen supply line 116 is connected to the primary combustion chamber 110 while a cooling and exhaust system 118 extends from the spark chamber 112. The oxygen supply line 116 supplies oxygen 200 to the primary combustion chamber 110 to enhance combustion of the biomass (not shown). In turn, the cooling and exhaust system 118 funnels off, cools and condenses the resultant gasified biomass or exhaust particulates 300 in a manner described in more detail hereinbelow.

Figure 3:
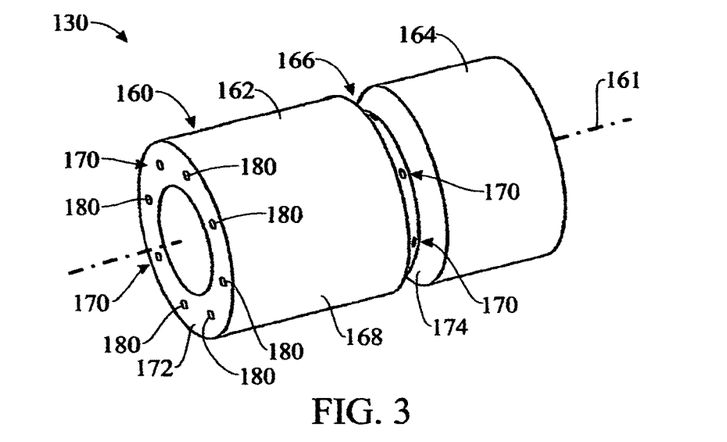
FIG. 3 presents an enlarged, front perspective view of an oxygen injector of the biomass combustion system of FIG. 1.
Figure 4:
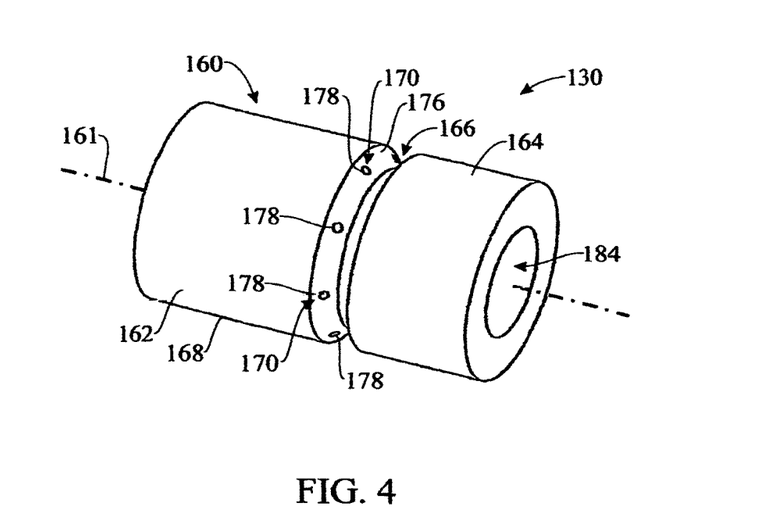
FIG. 4 presents an enlarged, fear perspective view of the oxygen injector of FIG. 3.
Figure 5:
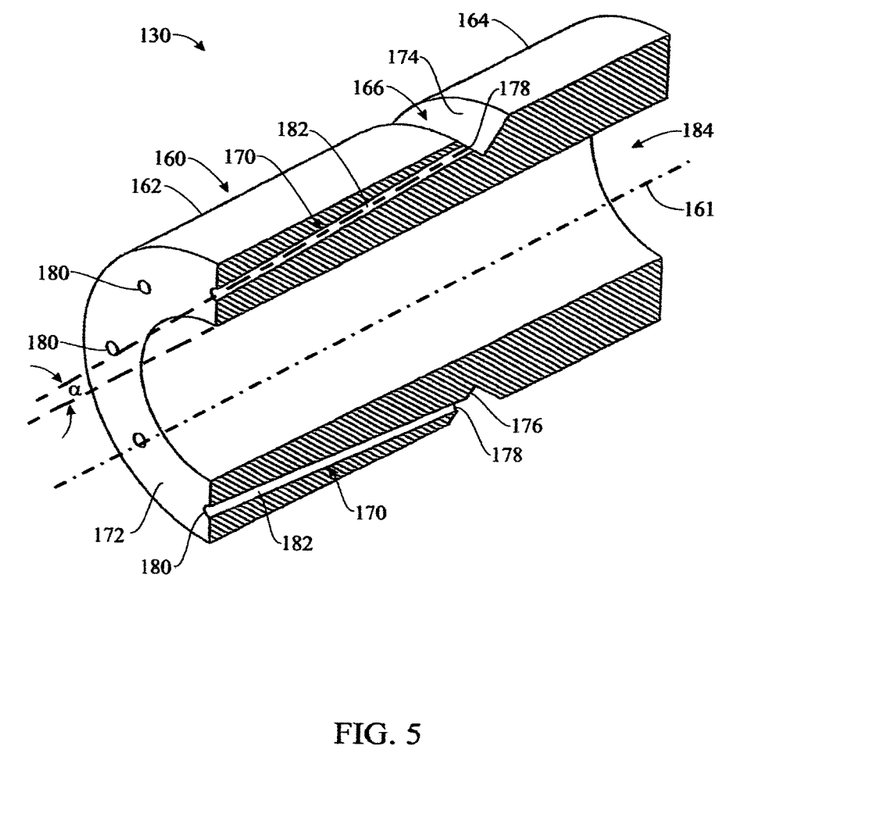
FIG. 5 presents an enlarged, cross-sectional perspective view of the oxygen injector of FIG. 3.

The primary combustion chamber 110 includes a primary combustion chamber body which may be cylindrical and is referred to hereinafter as primary combustion chamber cylinder 120. As best shown in FIG. 1, the primary combustion chamber cylinder 120 has a removable end cap 122 at a first end 124 of the primary combustion chamber cylinder 120 and an oxygen inlet 126 extending through the primary combustion chamber cylinder 120 adjacent an open second end 128 of the primary combustion chamber cylinder 120. An oxygen transfer device or directional oxygen injector 130, shown in the assembly of FIG. 2 and depicted separately in FIGS. 3-5, is positioned within the open second end 128 of the primary combustion chamber cylinder 120 (FIG. 2) and is in fluid communication with the oxygen supply line 116 through the oxygen inlet 126 as described in more detail hereinbelow. The directional oxygen injector 130 is provided. to direct oxygen into the primary combustion chamber cylinder 120 in a manner to enhance the combustion of a biomass contained therein.

With continued reference to FIG. 2, a first end 132 of the BTU transfer chamber 114 extends from the open second end 128 of the primary combustion chamber cylinder 120 and, more particularly, from the directional oxygen injector 130. A second end 134 of the BTU transfer chamber 114 is positioned within and connected to a sleeve-shaped connecting portion 136 of the spark chamber 112.

The spark chamber 112 further includes a first or upper portion 138 and a second or lower portion 140 extending downwardly from the upper portion 138. The sleeve-shaped connecting portion 136 extends perpendicularly from, and is in fluid communication with, the upper portion 138 of the spark: chamber 112. The cooling and exhaust system 118 extends from the tap of the upper portion 138 of the spark chamber 112. The spark chamber 112 is provided to allow secondary combustion of any unburned biomass exiting the primary combustion chamber 110 and the BTU transfer chamber 114.

As further shown in FIGS. 1 and 2, the oxygen supply line 116 includes a first end 142 for receipt of the supply of oxygen 200 from an external source of oxygen (not shown) and a second end 144 connected to the primary combustion chamber 110. Specifically, the second end 144 of the oxygen supply line 116 is connected to a manifold 146 which, in turn, is connected. 10 and in fluid communication with, the oxygen inlet 126 formed through the primary combustion chamber cylinder 120.

As noted above, the cooling and exhaust system 118 is provided to receive exhaust from the spark chamber 112 and cool and condense the exhaust particulates 300 (FIG. 6) passing therethrough. The cooling and exhaust system 118 includes an elongated cooling pipe 148 having a first end 150 extending from an upper face 152 of the upper portion 138 of the spark chamber 112 and a second end 154 for discharge of any cooled and condensed exhaust particulates 300. The elongated cooling pipe 148 extends multiple times along the length of the primary combustion chamber 110 and is supported around the primary combustion chamber 110 by a first and a second support bracket 156 and 158, respectively. The extended length of the elongated cooling pipe 148 allows sufficient time for the exhaust particulates passing therethrough to cool and condense, if applicable. In some embodiments, heat may be drawn off the elongated cooling pipe 148 to supply other systems, such as, but not limited to. a hot water or air system. etc.

Turning now to FIGS. 3-5, two outer perspective views and one cross-sectional perspective view are provided to illustrate details of the directional oxygen injector 130. As will be explained in more detail hereinafter, the directional oxygen injector 130 is configured to direct the flow of oxygen 200 into the primary combustion chamber cylinder 120 in a manner that enhances combustion within the primary combustion chamber cylinder 120. As best shown in FIGS. 3 and 4, the directional oxygen injector 130 comprises a generally cylindrical injector body 160 having and defining a central, longitudinal axis 161. The injector body 160 includes a front portion 162 and a rear portion 164 which have a matching cylindrical shape (i.e. a same external diameter). In order to receive oxygen 200 from the oxygen supply line 116 and transfer or inject the oxygen 200 into the primary combustion chamber cylinder 120 the directional oxygen injector 130 includes a circumferential oxygen supply ring 166. The oxygen supply ring 166 is arranged in an intermediate portion of the injector body 160 between the front portion 162 and the rear portion 164 and extends around a perimeter of the intermediate portion. The oxygen supply ring 166 is formed as an indentation or recess into an outer surface 168 of the injector body 160. Specifically, the indentation is generally V-shaped such that the oxygen supply ring 166 presents a forward sloping face 174 and a rearward sloping race 176, shown in FIGS. 3 and 4, respectively.

The directional oxygen injector 130 further includes a plurality of injection nozzle 170. As best shown in FIG. 5, each injection nozzle 170 is formed as a conduit extending from the oxygen supply ring 166 to a front face 172 of the injector nozzle 160 which terminates the front portion 162 of the injector body 160. More specifically. the injection nozzles 170 extend from rear openings 178 in the rearward sloping face 176 (FIG. 4) of the oxygen supply ring 166 to front openings 180 formed in the front face 172 (FIG. 3) of the injector body 160.

As best shown in FIG. 5, each injection nozzle 170 includes an injection channel 182 extending from the corresponding rear opening 178 in the circumferential oxygen supply ring 166 to the corresponding front opening 180 in the front face 172 of the injector body 160. The injection channels 182 extend longitudinally and radially inward at an angle a with the longitudinal axis 161 of the cylindrical injector body 160, from the rear openings 178 to the front openings 180, where a. is greater than 0° and preferably less than or equal to 45° As shown, the directional oxygen injector 130 and more specifically the injector body 160 defines a central through bore 184 for receipt of the B111 transfer chamber 114, which fits airtightly within the central through bore 184 while passage of exhaust is allowed out of the primary combustion chamber cylinder 120 through a central through bore 190 of the BTU transfer chamber 114 in a manner described hereinbelow.

Referring now to FIGS. 1, 2, 6 and 7. the use of the biomass combustion system 100 to more fully and cleanly burn an amount of biomass 400 using pure or relatively pure oxygen 200 will now be described. Initially, the end cap 122 of the primary combustion chamber 110 is removed and an amount of biomass 400 is loaded into an internal space 186 defined. by the primary combustion chamber cylinder 120. The end cap 122 is then replaced and the oxygen supply line 116 is connected to the external source of oxygen (not shown). In this manner, the biomass combustion system 100 is "loaded" and ready for operation to burn the biomass 400 and generate heat for use by other systems.

Figure 7:
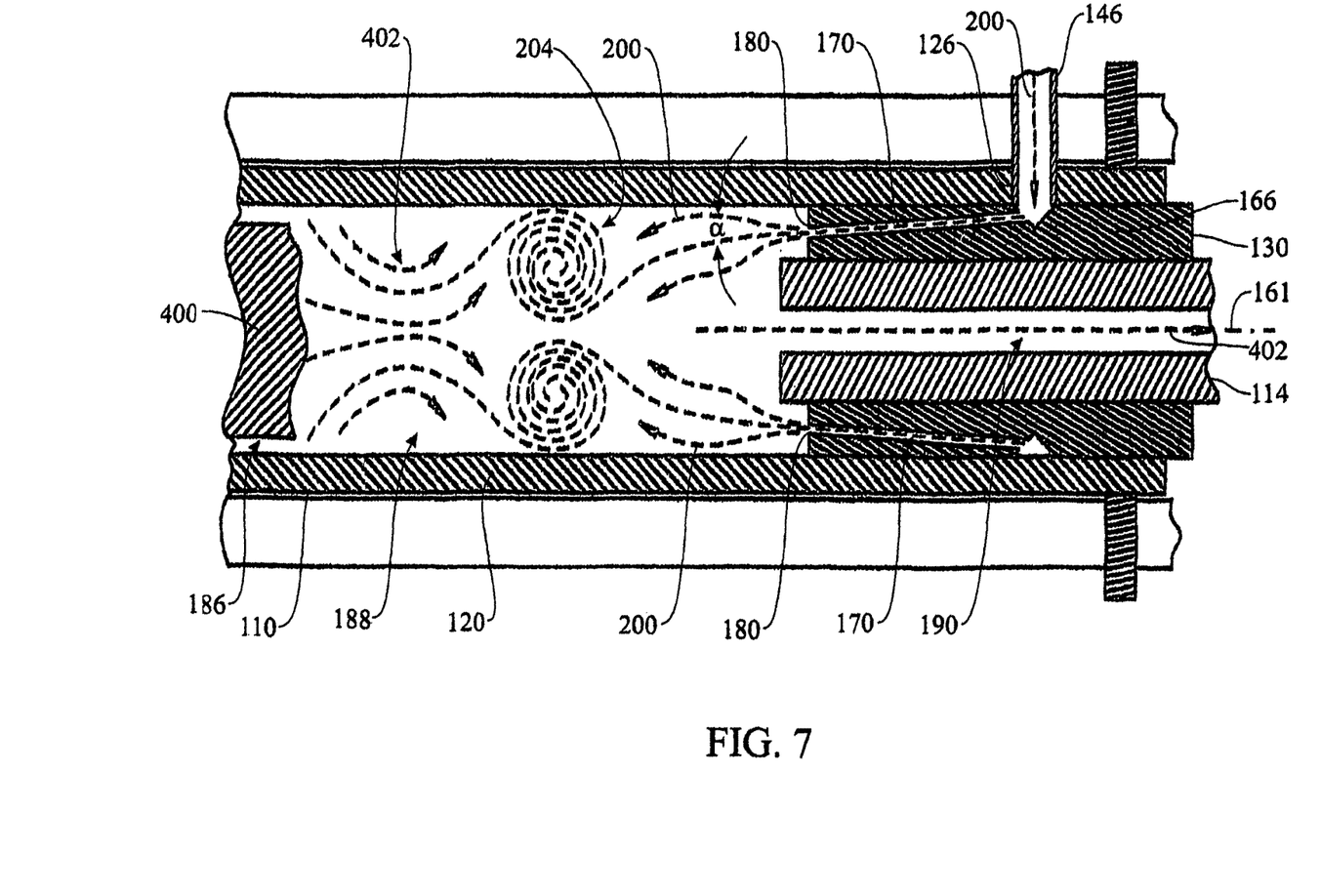
FIG. 7 presents an enlarged, cross-sectional side elevation view of an area of detail of FIG. 6.

The source of oxygen is then turned on causing oxygen 200 to flow through the manifold 146 and into the oxygen inlet 126 (FIGS. 1 and 2) formed in the primary combustion chamber cylinder 120. As best shown in FIG. 7, the oxygen inlet 126 is in fluid communication with the circumferential oxygen supply ring 166 formed in the injector body 160 of the directional oxygen injector 130. and more specifically with the front openings 180 on the rearward sloping face 176 of the circumferential oxygen supply ring 166. Thus, as the oxygen 200 passes into the directional oxygen injector 130, the oxygen 200 is directed into the internal space 186 of the primary combustion chamber cylinder 120 through the injection nozzles 170 of the directional oxygen injector 130. More specifically, as best shown in FIG. 1, the oxygen 200 exits the front openings 180 and is injected into. burn area 188 of the internal space 186 located between the biomass 400 and the front face 112 of the injector body 160.

As noted above and shown in FIG. 7, the injection nozzles 170 are oriented at an angle a relative to the longitudinal axis 161 of the directional oxygen injector 130. The primary combustion chamber cylinder 120 is concentric with the directional oxygen injector 130 and thus shares the longitudinal axis 161. By directing the flow of oxygen 200 into the burn area 188 at an angle a relative to the longitudinal axis 161, the flow of oxygen is caused to swirl forming a vortex of oxygen 204 within the burn area 188 in the primary combustion chamber cylinder 120.

With continued reference to FIG. 7, the operation of the biomass combustion system 100 is initiated by activation of an ignition mechanism or system (not shown) which operates to ignite the biomass 400 within the burn area 188 and begin to burn the biomass 400 to gasify or form gasified biomass 402. The combustion of the burning biomass 400 generates heat within the primary combustion chamber 110 for subsequent use by other systems. The use of pure or relatively pure oxygen 200 causes the biomass 400 to be burned at a temperature of approximately 1500° Celsius. The flow of oxygen 200 coming out of the injection nozzles 170 is opposite the direction of the flow gasified biomass 402 attempting to exit the system through the BTU transfer chamber 114. A vortex of oxygen 204 is created by the opposing flow. of the injected oxygen 200 the exiting gasified biomass 402. with creation of the vortex of oxygen 204 being favored by the fact that oxygen 200 is injected at an angle a relative to the longitudinal axis 161 of the directional oxygen injector 130. The vortex of oxygen 204 helps keep all the unburned, gasified biomass 402 inside the burn area 188 for a more complete oxidation. The gasified biomass 402 then reaches a pressure within the primary combustion chamber cylinder 110 such that it is formed into the central through bore 190 of the BTU transfer chamber 114. In some embodiments, as shown, the central through bore 190 of the BTU transfer chamber 114 can be concentric about the longitudinal axis 161 with the central through bore 184 of the injector body 160 of the directional oxygen injector 130.

Referring back to FIG. 6, as the gasified biomass 402 passes into the central through bore 190 of the BTU transfer chamber 114 and is transferred into a secondary burn area 192 defined within the secondary combustion or spark chamber 112 where final combustion of the biomass 400 takes place.

Figure 6:
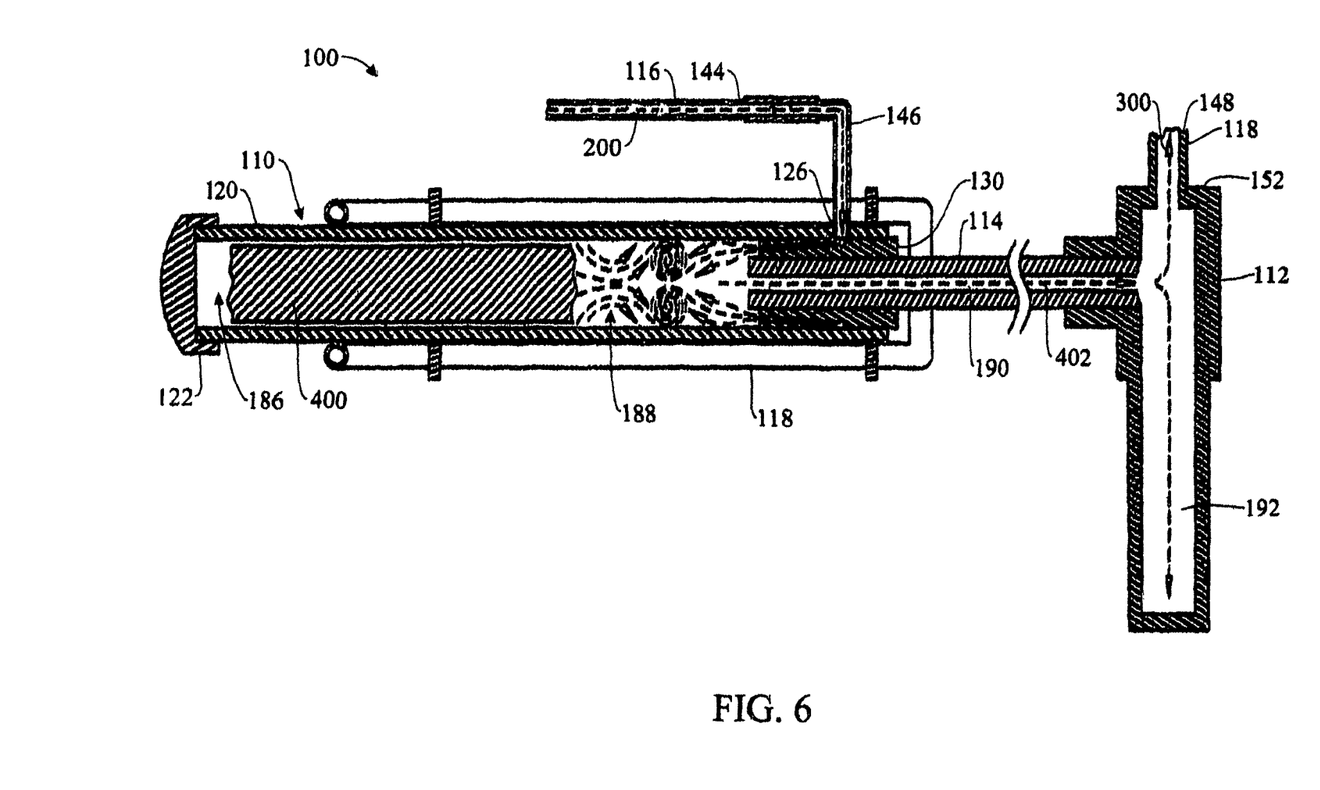
FIG. 6 presents a cross-sectional side elevation view of the biomass combustion system of FIG. 1.

With reference to FIGS. 1, 2 and 6, as the remaining gasified biomass 402 is burned it creates the exhaust particulates 300. At this point, the temperature of the burn cycle reaches approximately 1600 to 1800° Celsius of usable heat which can be drawn off for use in other systems. As the pressure of the now burned exhaust particulates 300 increases within the spark chamber 112 the exhaust particulates 300 are forced up through the upper face 152 of the spark chamber 112 and into the first end 150 of the elongated cooling pipe 148 (FIG. 6). Thus, the exhaust particulates 300 pass into the cooling and exhaust system 118 (FIGS. 1 and 2) where the last remaining heat from the combustion is removed and the exhaust particulates 300 are cooled down, and any remaining moisture in the gasified biomass 400, from the initial moisture in the biomass 400, is condensed out in the form a liquid exhaust particulate 302 exiting the second end 154 of the elongated cooling pipe 148 to complete the process, as shown in FIG. 1.

Thus, in this manner, the disclosed biomass combustion system 100 utilizes pure or relatively pure oxygen 200 to cause the biomass 400 to burn at a higher temperature ensuring a more complete combustion and resulting in less exhaust particulates 300 thereby reducing pollution while extracting a maximum amount of heat from the biomass 400.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly staled otherwise. The scope of the invention should be determined by the appended claims and their legal equivalents.

REF NO.: DESCRIPTION

100 Biomass Combustion System
110 Primary Combustion Chamber
112 Spark Chamber
114 British Thermal Unit or BTU Transfer Chamber
116 Oxygen Supply Line
118 Cooling and Exhaust System
120 Primary Combustion Chamber Cylinder
122 End Cap
124 First End (120)
126 Oxygen Inlet
128 Second End (120)
130 Directional Oxygen Injector
132 First End (114)
134 Second End (114)
136 Sleeve (112)
138 Upper Portion (112)
140 Lower Portion (112)
142 First End (116)
144 Second End (116)
146 Manifold
148 Elongated Cooling Pipe
150 First End (148)
152 Upper Face (138)
154 Second End (148)
156 First Support Bracket
158 Second Support Bracket
160 Cylindrical Injector Body
161 Longitudinal Axis
162 Front Portion
164 Rear Portion
166 Oxygen Supply Ring
168 Outer Surface (160)
170 Injector Parts
172 Front Face (160)
174 Forward Sloping Face
176 Rear ward Sloping Face
178 Rear Openings (170)
180 Front Openings (170)
182 Injection Channels
184 Central Through Bore (160)
186 Internal Space
188 Burn Area (186)
190 Central Though Bore (114)
192 Secondary Burn Area
200 Oxygen
204 Vortex of Oxygen
300 Exhaust Particles
302 Liquid Exhaust Particulate
400 Biomass
402 Gasified Biomass

What is claimed is:

1. A biomass combustion system comprising:
a primary combustion chamber defining an internal space along a longitudinal axis of said combustion chamber for the receipt and burning of a biomass;
wherein said combustion chamber comprises at a first end an end cap removable to allow said biomass to be placed within and at a second end in a coaxial arrangement with the longitudinal axis of said combustion chamber an oxygen injector located radially inside said combustion chamber and a transfer chamber with a central bore located radially inside and extending through said oxygen injector;
an oxygen supply connected to said oxygen injector;
said oxygen injector including a plurality of injection nozzles radially spaced around said longitudinal axis of said combustion chamber and angled toward the longitudinal axis such that oxygen which is injected into said internal space forms a vortex of oxygen to ignite the biomass within said internal space to cause oxidation of the biomass.

2. The biomass combustion system of claim 1, wherein said oxygen is injected at an angle greater than 0° but less than 45° relative to the longitudinal axis of said combustion chamber.

3. The biomass combustion system of claim 1, wherein said transfer chamber is connected to a secondary combustion chamber;
said secondary combustion chamber having a longitudinal axis, wherein at a first end of said secondary combustion chamber is an exhaust system and at a second end of said secondary combustion chamber is a secondary burn area.

4. The biomass combustion system of claim 3, wherein said longitudinal axis of said secondary combustion chamber is perpendicular to said longitudinal axis of said primary combustion chamber.

5. A method of burning a biomass comprising the steps of:
providing the combustion system of claim 1;
positioning a biomass within said internal space;
injecting oxygen into the internal space through said plurality of injection nozzles such that the injected oxygen forms a vortex of oxygen within said internal space;
igniting the biomass within said internal space, to cause an oxidation of the biomass; and
exhausting a resulting substance obtained from the oxidation of the biomass through said transfer chamber.

* * * * *